US008741014B2

(12) United States Patent
Kondo et al.

(10) Patent No.: US 8,741,014 B2
(45) Date of Patent: Jun. 3, 2014

(54) MULTI-STAGE STEAM-WATER SEPARATION DEVICE AND STEAM-WATER SEPARATOR

(75) Inventors: Yoshiyuki Kondo, Tokyo (JP); Jiro Kasahara, Tokyo (JP); Kengo Shimamura, Tokyo (JP); Kenji Nishida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 137 days.

(21) Appl. No.: 13/386,515

(22) PCT Filed: Jul. 29, 2010

(86) PCT No.: PCT/JP2010/062770
§ 371 (c)(1),
(2), (4) Date: Jan. 23, 2012

(87) PCT Pub. No.: WO2011/070818
PCT Pub. Date: Jun. 16, 2011

(65) Prior Publication Data
US 2012/0117928 A1    May 17, 2012

(30) Foreign Application Priority Data
Dec. 10, 2009 (JP) ................ 2009-280550

(51) Int. Cl.
*B01D 45/00* (2006.01)
(52) U.S. Cl.
USPC .............. 55/442; 55/447; 55/457; 55/456; 55/392; 55/394; 55/398; 55/399; 55/DIG. 23; 55/396

(58) Field of Classification Search
USPC .......... 55/442, 447, 457, 456, 392, 394, 398, 55/399, 39, DIG. 236; 137/171
See application file for complete search history.

(56) References Cited

U.S. PATENT DOCUMENTS

| 3,902,876 A | * | 9/1975 | Moen et al. ............... 55/348 |
| 4,650,578 A | | 3/1987 | Cerdan et al. |
| 2009/0007530 A1 | * | 1/2009 | Kondo et al. ............... 55/457 |

FOREIGN PATENT DOCUMENTS

| EP | 0859368 A1 | 8/1998 |
| JP | 49-80669 A | 8/1974 |
| JP | 52-059294 A | 5/1977 |
| JP | 60-257864 A | 12/1985 |
| JP | 06-075082 A | 3/1994 |
| JP | 06-273571 A | 9/1994 |

(Continued)

OTHER PUBLICATIONS

International Search Report of PCT/JP2010/062770, mailing date of Nov. 16, 2010.

(Continued)

*Primary Examiner* — Jason M Greene
*Assistant Examiner* — Dung H Bui
(74) *Attorney, Agent, or Firm* — Westerman, Hattori, Daniels & Adrian, LLP

(57) ABSTRACT

In a multi-stage steam-water separation device and a steam-water separator, a first swirl vane (6) which causes a gas-liquid two-phase flow to rise while swirling is provided in a first riser (5) of a first steam-water separator (2), and a second swirl vane (12) which causes the gas-liquid two-phase flow which has passed through the first swirl vane (6) to rise while swirling at a speed higher than that provided by the first swirl vane (6), is provided in a second riser (11).

10 Claims, 8 Drawing Sheets

(56) References Cited

FOREIGN PATENT DOCUMENTS

| | | |
|---|---|---|
| JP | 10-186079 A | 7/1998 |
| JP | 2000-329889 A | 11/2000 |
| JP | 2001-079323 A | 3/2001 |
| JP | 2001-208301 A | 8/2001 |
| JP | 2002-143620 A | 5/2002 |
| JP | 2002-326002 A | 11/2002 |
| JP | 3901936 B2 | 4/2007 |
| JP | 2007-229661 A | 9/2007 |
| JP | 2007-232527 A | 9/2007 |
| JP | 3971146 B2 | 9/2007 |
| JP | 4008288 B2 | 11/2007 |

OTHER PUBLICATIONS

Written Opinion of the International Search Authority of PCT/JP2010/062770, mailing date of Nov. 16, 2010.

Japanese Office Action dated Nov. 26, 2013, issued in Japanese Patent Application No. 2009-280550, w/English translation, (4 pages).

* cited by examiner

MULTI-STAGE STEAM-WATER SEPARATION DEVICE AND STEAM-WATER SEPARATOR

TECHNICAL FIELD

The present invention relates to a multi-stage steam-water separation device and a steam-water separator for separating a gas-liquid two-phase flow composed of a mixture of steam and hot water into steam and water.

Priority is claimed on Japanese Patent Application No. 2009-280550, filed Dec. 10, 2009, the contents of which are incorporated herein by reference.

BACKGROUND ART

In general, a steam generator which constitutes a facility such as a turbine generator for generating electricity with use of steam is provided with a steam-water separator in order to prevent erosion and to prevent energy transmission efficiency. As an example of a steam-water separator, there is one which has a cylinder-shaped riser provided in the gravitational direction and in which a gas-liquid two-phase flow composed of a mixture of steam and hot water rises, a downcomer barrel arranged so as to surround the periphery of this riser, and a swirl vane provided within the riser.

With this type of configuration, a gas-liquid two-phase flow introduced from the bottom end part of the riser is swirled by the swirl vane while rising, and is separated into steam and hot water. While the steam continues to swirl and rise towards the upper side of the riser, the hot water descends within the downcomer space defined by the riser and the downcomer barrel.

Here, there is a limit in separating a gas-liquid two-phase flow into steam and water by making it swirl, and so-called carry-under occurs, in which hot water descending inside the downcomer space entrains steam. Moreover, carry-over occurs, in which steam rising towards the upper side of the riser entrains hot water. Therefore, various techniques have been disclosed in order to reduce the level of carry-under and carry-over.

For example, there is one in which a plurality of blades provided projecting from a swirl vane are arranged so as to overlap with each other in the axial direction, and a deck plate is provided above the riser. Further, between the deck plate and the downcomer barrel 4, there is formed a slit-shaped opening part, and at the exit of the downcomer space, an intermediate deck plate with an outer diameter substantially the same as that of the downcomer barrel, is installed on the riser (for example, refer to Patent Document 1).

According to this, it is possible to make it unlikely for the separated water to exit from between the respective blades of the swirl vane. Moreover, it aims to reduce carry-over by causing rising steam to collide with the deck plate, and reduce carry-under by causing hot water to collide with the intermediate deck plate.

PRIOR ART DOCUMENTS

Patent Documents

[Patent Document 1] Japanese Patent No. 4008288

SUMMARY OF THE INVENTION

Problems to be Solved by the Invention

However, there is a problem in the above conventional technique in that, as a result of making it unlikely for the separated water to exit from between the respective blades of the swirl vane and causing steam to collide with the deck plate, pressure loss in the steam passing through the steam-water separator becomes greater, and consequently the efficiency of energy transmission is reduced.

Furthermore, since the intermediate deck plate is provided, it is necessary to form a space radially outside this intermediate deck plate, through which space the separated steam and hot water can pass. Therefore, there is a problem in that it is necessary to make the outer diameter of the steam-water separator large, and consequently the size of the device becomes large.

The present invention takes into consideration the above circumstances, with an object of providing a multi-stage steam-water separation device and a steam-water separator which are capable of efficiently separating a gas-liquid two-phase flow into steam and water without reducing the efficiency of energy transmission, and miniaturization of which is possible.

Means for Solving the Problem

In order to solve the above problems, the multi-stage steam-water separation device of the present invention is a multi-stage steam-water separation device provided with, in two stages, a steam-water separator which has a cylindrical riser, into which a gas-liquid two-phase flow composed of a mixture of steam and hot water is introduced, and a downcomer barrel arranged so as to surround the periphery of this riser, wherein within the rise of the steam-water separator of the first stage, there is provided a first swirl vane which causes the gas-liquid two-phase flow to rise while swirling, and within the riser of the steam-water separator of the second stage, there is provided a second swirl vane which causes the gas-liquid two-phase flow which has passed through the first swirl vane to rise while swirling at a speed higher than that provided by the first swirl vane.

By providing the swirl vanes for making a gas-liquid two-phase flow swirl and rise in a two-stage structure comprising the first swirl vane and the second swirl vane in this way, it is possible to reduce the amount of changes in load applied to steam passing through each swirl vane. Therefore, it is possible to provide a multi-stage steam-water separation device capable of reducing steam pressure loss, and improving energy transmission efficiency.

In the multi-stage steam-water separation device of the present invention, within a downcomer space, of at least the steam-water separator of the first stage, defined by the riser and the downcomer barrel, there may be provided a swirl return vane for restricting the swirling of a mixed flow primarily composed of hot water, which is introduced into this downcomer space.

With this type of configuration, the swirl return vane restricts the swirling of the mixed flow, and carry-under can be reduced. In addition, since hot water separated from the mixed flow descends while passing through the swirl return vane, there is no need for forming a space radially outside the intermediate deck plate as has been practiced conventionally, and it is possible to suppress an increase in the size of the multi-stage steam-water separation device.

In the multi-stage steam-water separation device of the present invention, in the steam-water separator of the first stage, an inner cone formed with a diameter gradually increasing towards downstream may be provided on the downstream side of the first swirl vane within the riser.

With this type of configuration, the swirl flow which has passed the first swirl vane is pushed against the inner cone, and a liquid film is formed on the inner peripheral surface of the inner cone. That is to say, hot water becomes attached on the inner peripheral surface of the inner cone. Therefore, it is possible to more efficiently perform steam-water separation while reducing stream pressure loss.

In the multi-stage steam-water separation device of the present invention, within a liquid film separation space defined by the inner cone and the riser, there may be provided a liquid film separation vane for restricting the swirling of a mixed flow primarily composed of hot water, which is introduced into this liquid film separation space.

With this type of configuration, steam-water separation can be performed for a mixed flow, using the liquid film separation vane. Therefore, carry-under of the mixed flow passing through the liquid film separation space can be reduced.

In the multi-stage steam-water separation device of the present invention, in positions corresponding to the liquid film separation space of the riser and on the upper side of the liquid film separation vane in the gravitational direction, there may be provided a plurality of slits.

With this type of configuration, hot water attached on the liquid film separation space side of the riser can rapidly exit to the downcomer space side through the plurality of slits. Therefore, it is possible to separate a gas-liquid two-phase flow into steam and water even more efficiently.

In the multi-stage steam-water separation device of the present invention, in the steam-water separator of the first stage, on the downstream side of the first swirl vane in the riser, there may be provided a third swirl vane which causes the gas-liquid two-phase flow to swirl at a speed higher than that provided by this first swirl vane, and which causes the gas-liquid two-phase flow to swirl at a speed lower than that provided by the second swirl vane.

With this type of configuration, it is possible to reduce the amount of changes in load applied to steam passing through the respective swirl vanes, and reliably perform steam-water separation with gas-liquid two-phase flow while reducing steam pressure loss.

In the multi-stage steam-water separation device of the present invention, the third swirl vane may have a cylinder part through the interior of which the gas-liquid two-phase flow can pass, and a plurality of blade parts provided on the outer peripheral surface of the cylinder part around the circumferential direction.

With this type of configuration, it is possible to reliably reduce pressure loss in steam passing through the third swirl vane.

In the multi-stage steam-water separation device of the present invention, on the downstream side of the steam-water separator of the first stage, there may be parallely provided a plurality of the steam-water separators of the second stage, and the riser of respective steam-water separators of the second stage may be consolidated with the riser of the steam-water separator of the first stage.

With this type of configuration, it is possible to make the sectional area of the riser of the steam-water separator of the second stage large, and reliably reduce the flow velocity of gas-liquid two-phase flow to be introduced to the second stage. Moreover, as a result of a reduction in the flow velocity, it is possible to increase the efficiency of steam-water separation performed by the second swirl vane.

The steam-water separator of the present invention is a steam-water separator comprising a cylindrical riser into which a gas-liquid two-phase flow composed of a mixture of steam and hot water is introduced, and a downcomer barrel arranged so as to surround the periphery of this riser, wherein: within the riser, there is provided a swirl vane which causes the gas-liquid two-phase flow to swirl and rise; on the downstream side of this swirl vane, there is provided an inner cone formed with a diameter gradually increasing towards downstream; and in a liquid film separation space defined by the inner cone and the riser, there is provided a liquid film separation vane which restricts the swirl of a mixed flow primarily composed of hot water introduced into the liquid film separation space.

With this type of configuration, hot water of the swirling flow which has passed through the swirl vane is pushed against the inner cone and becomes a liquid film, and it is therefore possible to efficiently perform steam-water separation. Moreover, since steam-water separation of a mixed flow can be performed with the liquid film separation vane, carry-under can be reduced efficiently.

In the steam-water separator of the present invention, within a downcomer space defined by the riser and the downcomer barrel, there may be provided a swirl return vane for restricting the swirling of the mixed flow primarily composed of hot water, which is introduced into this downcomer space.

With this type of configuration, it is possible to reduce carry-under of the mixed flow in the downcomer space while achieving miniaturization.

In the steam-water separator of the present invention, in positions corresponding to the liquid film separation space of the riser and on the upper side of the liquid film separation vane in the gravitational direction, there may be provided a plurality of slits.

With this type of configuration, hot water attached on the liquid film separation space side of the riser can be transferred to the downcomer space side through the plurality of slits, and steam-water separation can be efficiently performed with a gas-liquid two-phase flow.

Effects of the Invention

According to the present invention, by providing the swirl vanes for making a gas-liquid two-phase flow swirl and rise, in a two-stage structure comprising the first swirl vane and the second swirl vane, it is possible to reduce the amount of changes in load applied to steam passing through each swirl vane. Therefore, it is possible to provide a multi-stage steam-water separation device capable of reducing steam pressure loss, and improving energy transmission efficiency.

Furthermore, the swirl return vane restricts the swirling of the mixed flow, and carry-under can be reduced. In addition, since hot water separated from the mixed flow descends while passing through the swirl return vane, there is no need for forming a space radially outside the swirl return vane, and it is possible to suppress an increase in the size of the multi-stage steam-water separation device.

BEST MODE FOR CARRYING OUT THE INVENTION

First Embodiment

Multi-Stage Steam-Water Separation Device

Figure 1:
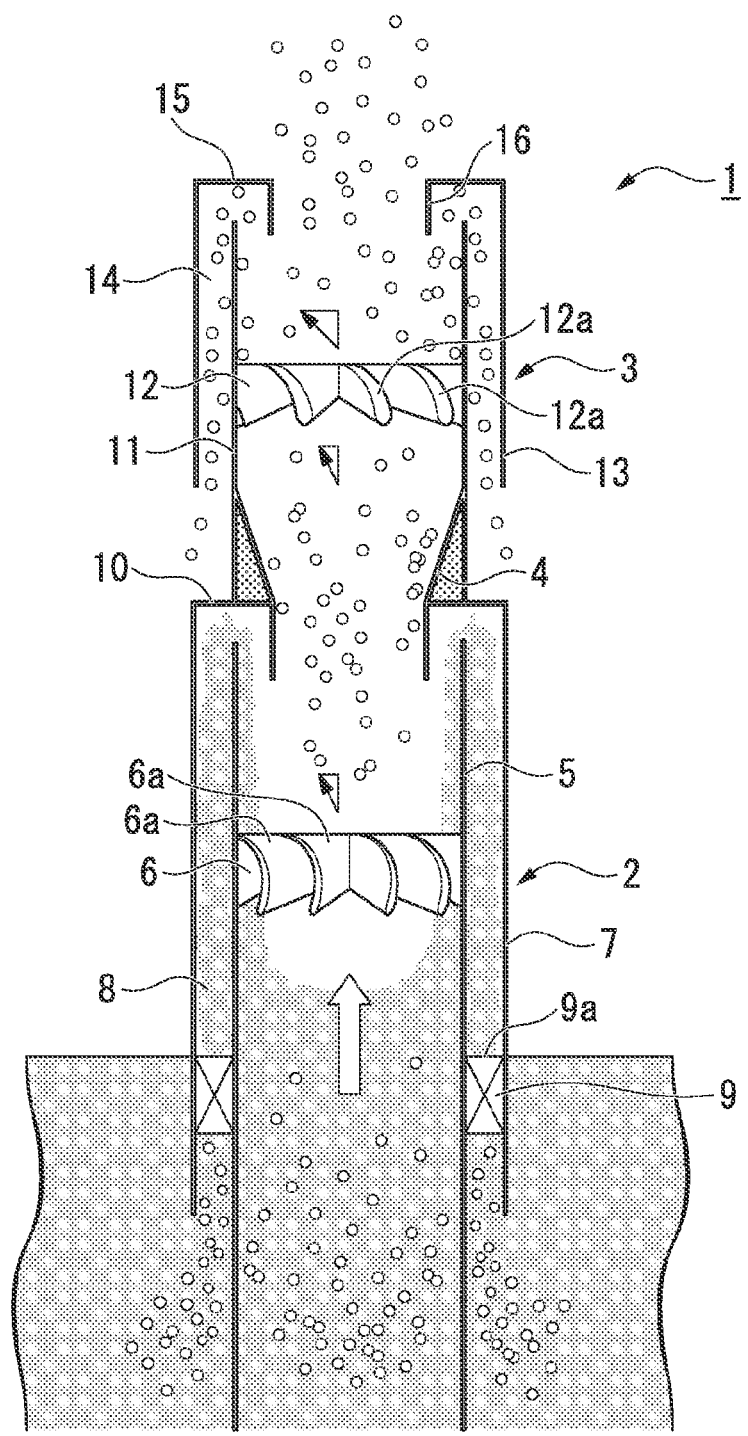
FIG. 1 is a schematic configuration diagram of a multi-stage steam-water separation device according to a first embodiment of the present invention.
Figure 2:
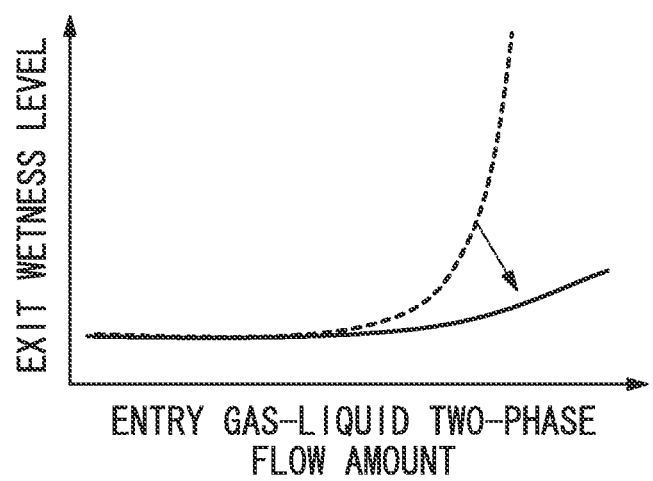
FIG. 2 is a graph showing changes in the level of wetness at the exit in the first embodiment of the present invention.

Next, a first embodiment of the present invention is described, with reference to FIG. 1 and FIG. 2.

FIG. 1 is a schematic configuration diagram of a multi-stage steam-water separation device 1.

As shown in FIG. 1, the multi-stage steam-water separation device 1 is to be provided in a steam generator (not shown in the diagram), which constitutes a facility such as a turbine generator for generating electricity with use of steam, and it is to separate a gas-liquid two-phase flow composed of a mixture of steam and hot water (mixed flow) into steam and water. The multi-stage steam-water separation device 1 has a first steam-water separator 2, and a second steam-water separator 3 which is provided on the downstream side (upper side in FIG. 1) of this first steam-water separator 2 and is connected to the first steam-water separator 2 via a first orifice 4, arranged in a vertical two-stage structure.

In the multi-stage steam-water separation device 1, the introduced gas-liquid two-phase flow is separated into gas (steam) and liquid (water, hot water), and the gas (steam) is raised. Taking gas flow and liquid flow within the multi-stage steam-water separation device 1 into consideration, the gas-liquid two-phase flow introduction side is taken as the upstream side, and the direction in which the gas separated from the gas-liquid two-phase flow rises, that is, the side on which a second orifice 16 is installed, is taken as the downstream side.

(First Steam-Water Separator)

The first steam-water separator 2 has a substantially cylindrical first riser 5 capable of introducing a gas-liquid two-phase flow rising from a steam generator. In the first riser 5 there is provided a first swirl vane 6 which imparts a swirling force to the gas-liquid two-phase flow. This first swirl vane 6 is a so-called hubless swirl vane, which does not have a hub, and is provided with a plurality of blades 6a provided in a radial pattern. By employing a hubless swirl vane as the first swirl vane 6, it is possible to prevent counter flow at the hub wake flow area which occurs in those cases of using a swirl vane with a hub.

Around the first riser 5 there is arranged a first downcomer barrel 7 so as to surround this first riser 5. These first riser 5 and first downcomer barrel 7 define an annular shaped first downcomer space 8. In this first downcomer space 8 there is provided a stationary type swirl return vane 9. The swirl return vane 9 is to restrict the swirling of a mixed flow primarily composed of hot water introduced into the first downcomer space 8, and has a plurality of blades 9a parallely provided around the circumferential direction. The plurality of blades 9a are arranged angled with respect to the axial direction, so as to respectively intersect with the swirling direction of the mixed flow.

The plurality of blades 9a, for example, are parallely provided and fixed at substantially equal intervals, around the circumferential direction of the outer wall of the first riser 5, and serve as the swirl return vane 9. There is no particular limitation on the fixation position of the plurality of blades 9a, and they may be fixed on the inner wall surface of the first downcomer barrel 7.

Above the first riser 5 and the first downcomer barrel 7 there is arranged, with a predetermined clearance therefrom, a first deck plate 10. In the portion of this first deck plate 10 corresponding to the first riser 5, there is provided the first orifice 4. The first orifice 4 is formed with a diameter gradually increasing towards the downstream side, that is, the second steam-water separator 3 side.

Specifically, the first deck plate 10 may be of an annular-shaped plate which continues to the upper end periphery part of the first downcomer barrel 7. The first deck plate 10 has in the center thereof, a through hole with a diameter smaller than that of the first riser 5. Between the upper end part of the first riser 5 and the first deck plate 10, there is ensured a space for allowing swirling fluid (may contain a gas in some cases) to pass therethrough. The first orifice 4 is installed so as to pass through the through hole in the first deck plate 10. In FIG. 1, the first orifice 4 has a cylinder part on the upstream side and a diameter-expanding part on the downstream side which continues from the cylinder part. The diameter of the lower end periphery part of the cylinder part of the first orifice 4 is smaller than the diameter of the first riser 5. Between the lower end of the cylinder part of the first orifice 4 and the upper end or inner wall surface of the first riser 5, there is ensured a space for allowing swirling fluid (may contain a gas in some cases) to pass therethrough.

(Second Steam-Water Separator)

The second steam-water separator 3 has a cylindrical second riser 11 into which can be introduced the gas-liquid two-phase flow which passes through the first swirl vane 6 of the first steam-water separator 2 and thereby swirls and rises. The top end side outer periphery of the first orifice 4 is in contact internally with the second riser 11.

In the second riser 11 there is provided a second swirl vane 12 which imparts a swirling force to the gas-liquid two-phase flow. The second swirl vane 12 also employs a so-called hubless vane as with the first swirl vane 6. The second swirl vane 12 is also provided with a plurality of blades 12a.

Here, the angle of attack of the blades 12a of the second swirl vane 12 is set to an angle greater than the angle of attack of the blades 6a of the first swirl vane 6. That is to say, the second swirl vane 12 causes rotation at a speed higher than that of the first swirl vane 6 so as to be able to impart a swirling force to the gas-liquid two-phase flow that is greater than that provided by the first swirl vane 6.

Around the second riser 11, there is arranged a second downcomer barrel 13 so as to surround this second riser 11. These second riser 11 and second downcomer barrel 13 define an annular shaped second downcomer space 14.

Above the second riser 11 and the second downcomer barrel 13 there is arranged, with a predetermined clearance therefrom, a second deck plate 15. In the portion of this second deck plate 15 corresponding to the second riser 11, there is provided the second orifice 16.

Specifically, the second riser 11 is installed on the downstream side surface of the first deck plate 10. The first orifice 4 is installed so as to pass through the through hole in the first deck plate 10, and the upper end periphery part of the diameter-expanding part of the first orifice 4 is in contact with the inner wall surface of the second riser 11. The second deck plate 15 may be of an annular-shaped plate which continues to the upper end periphery part of the second downcomer barrel 13. The second deck plate 15 has, in the center thereof, a through hole with a diameter smaller than that of the second riser 11. Between the upper end part of the second riser 11 and the second deck plate 15, there is ensured a space for allowing a liquid film in a swirling state to pass therethrough. In the through hole of the second deck plate 15 there is provided the cylindrical second orifice 16. The diameter of the second orifice 16 is smaller than the diameter of the second riser 11. Between the lower end part of the second orifice 16 and the upper end part or inner wall surface of the second riser 11, there is ensured a space for allowing a liquid film in a swirling state to pass therethrough. Although not shown in the diagram, the second downcomer barrel 13 is fixed within the steam generator (not shown in the diagram).

(Operation)

With this type of configuration, having been introduced into the first riser 5 of the first steam-water separator 2, the gas-liquid two-phase flow rising from the steam generator (not shown in the diagram) passes through the first swirl vane 6 and rises while swirling at a low to intermediate speed. As a result, the mixed flow primarily composed of hot water flows out into the first downcomer space 8 due to the separation effect caused by the swirling, and descends through this first downcomer space 8. On the other hand, the mixed flow primarily composed of steam flows out into the first orifice 4.

The mixed flow which has flowed into the first downcomer space 8 descends while maintaining its swirling motion and entraining steam, and it reaches the swirl return vane 9.

Here, since the blades 9a of the swirl return vane 9 are arranged so as to intersect with the swirling direction of the mixed flow, the mixed flow collides with the blades 9a of the swirl return vane 9 and the swirling motion of the mixed flow is damped consequently. Therefore, steam-water separation of the mixed flow is performed at the swirl return vane 9, and hot water contained in the mixed flow continues to travel and descend through between the blades 9a. Moreover, steam contained in the mixed flow rises in the first downcomer space 8.

On the other hand, since the mixed flow which has flowed into the first orifice 4 also rises while swirling, hot water contained in this mixed flow is pushed against the inner peripheral surface of the lower half of the first orifice 4, and becomes a liquid film. The liquid film is entrained with the mixed flow rising within the first orifice 4 and rises, and travels on the inner circumferential surface of the second riser 11 of the second steam-water separator 3 to be blown into the second downcomer space 14.

Furthermore, the mixed flow which has passed through the first orifice 4 passes through the second swirl vane 12. At this time, the angle of attack of the blades 12a of the second swirl vane 12 is set to an angle greater than the angle of attack of the blades 6a of the first swirl vane 6, and therefore the mixed flow rises while swirling at a high speed.

In the second steam-water separator 3, the mixed flow which has passed through the second swirl vane 12, swirls at a high speed, and consequently, hot water which has not been separated in the first steam-water separator 2 is now separated. Then, this hot water flows into the second downcomer space 14 and descends.

On the other hand, the steam which has been separated by the second swirl vane 12 rises through the second orifice 16. Although hot water is slightly contained in the steam which has flowed out from the second steam-water separator 3, the minute hot water contained in this steam is separated by gravitational separation and a moisture separator (not shown in the diagram).

(Operation)

Therefore, according to the first embodiment described above, by providing the multi-stage steam-water separation device 1 in a two-stage structure with the first steam-water separator 2 having the first swirl vane 6 which causes the gas-liquid two-phase flow rising from the steam generator (not shown in the diagram) to swirl at a low to intermediate speed and rise, and the second steam-water separator 3 having the second swirl vane 12 which causes the gas-liquid two-phase flow to swirl at a high speed and rise, it is possible to reduce the amount of changes in load applied to the gas-liquid two-phase flow (steam) passing through the respective swirl vanes 6 and 12. Accordingly, pressure loss of the gas-liquid two-phase flow can be reduced, and energy transmission efficiency can be improved.

FIG. 2 is a graph showing changes in the level of wetness at the exit, wherein the vertical axis represents wetness level of steam flowing out from the multi-stage steam-water separation device 1 (exit wetness level), and the horizontal axis represents the flow rate of the gas-liquid two-phase flow introduced into the multi-stage steam-water separation device 1 (entry gas-liquid two-phase flow rate).

As shown in this diagram, in the multi-stage steam-water separation device 1 of the present embodiment, it can be confirmed that an increase in the level of exit wetness can be suppressed even when the flow rate increases (refer to the solid line in FIG. 2), whereas in the conventional steam-water separator, the level of exit wetness rapidly increases as the flow rate increases (refer to the dotted line in FIG. 2).

Moreover, in the first steam-water separator 2, by providing the swirl return vane 9 in the first downcomer space 8 defined by the first riser 5 and the first downcomer barrel 7, it is possible to restrict the swirling of the mixed flow introduced into the first downcomer space 8. Therefore, steam-water separation of the mixed flow is performed at the swirl return vane 9, and hot water contained in the mixed flow continues to travel and descend through between the blades 9a. As a result, carry-under can be reliably reduced and there is no need for forming a space radially outside the intermediate deck plate as conventionally practiced, and accordingly, an increase in the size of the multi-stage steam-water separation device 1 can be suppressed.

Second Embodiment

Figure 3:
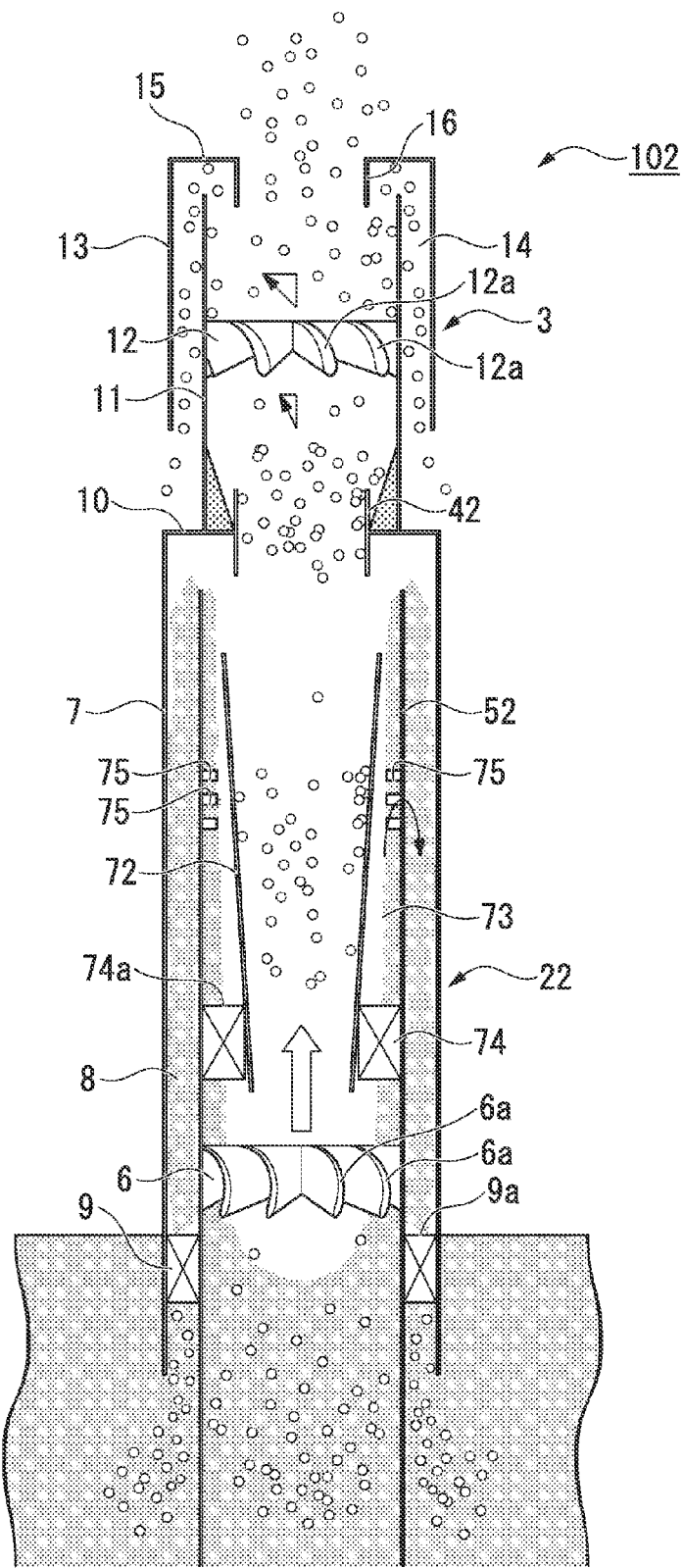
FIG. 3 is a schematic configuration diagram of a multi-stage steam-water separation device according to a second embodiment of the present invention.

Next, a second embodiment of the present invention is described, with reference to FIG. 3. Aspects the same as those of the first embodiment are described with the same reference symbols (this also applies to the following embodiments).

FIG. 3 is a schematic configuration diagram of a multi-stage steam-water separation device 102 according to the second embodiment.

In this second embodiment, the basic configuration including the following points is similar to those of the first embodiment (this also applies to the third embodiment and fourth embodiment).

I) A multi-stage steam-water separation device 102 is to be provided in a steam generator (not shown in the diagram), which constitutes a facility such as a turbine generator for generating electricity with use of steam, and it is to separate a gas-liquid two-phase flow composed of a mixture of steam and hot water into steam and water.

II) The multi-stage steam-water separation device 102 has a first steam-water separator 22, and a second steam-water separator 3 which is provided on the downstream side of this first steam-water separator 22 and is connected to the first steam-water separator 22 via a first orifice 42, arranged vertically one above the other.

III) The first steam-water separator 22 has a first riser 52 and a first downcomer barrel 7, a first swirl vane 6 is provided within the first riser 52, and a swirl return vane 9 is provided within the first downcomer space 8.

IV) The second steam-water separator 3 has a second riser 11 and a second downcomer barrel 13, and a second swirl vane 12 is provided in the second riser 11.

(First Steam-Water Separator)

Here, in the first steam-water separator 22 of the second embodiment, an inner cone 72 is provided on the downstream side of the first swirl vane 6 in the first riser 52. The inner cone 72 is formed with a diameter gradually increasing towards the downstream side. By providing the inner cone 72, a liquid film separation space 73 is defined between this inner cone 72 and the first riser 52.

In FIG. 3, the inner cone 72 is arranged so that the upper end position of the inner cone 72 is arranged on the upstream side of the upper end position of the first riser 52. Between the upper end periphery of the inner cone 72 and the inner wall of the first riser 52, there is formed a space sufficient to allow a liquid film to pass therethrough.

In this liquid film separation space 73, there is provided a stationary type liquid film separation vane 74. The basic configuration of the liquid film separation vane 74 is the same as that of the swirl return vane 9. That is to say, the liquid film separation vane 74 is to restrict the swirling of a mixed flow primarily composed of hot water introduced into the liquid film separation space 73, and has a plurality of blades 74a parallely provided around the circumferential direction. The plurality of blades 74a are arranged angled with respect to the axial direction, so as to intersect with the swirling direction of the mixed flow.

The plurality of blades 74a, for example, are parallely provided and fixed at substantially equal intervals, around the circumferential direction of the outer wall of the inner cone 72, and serve as the liquid film separation vane 74. There is no particular limitation on the fixation position of the plurality of blades 74a, and they may be fixed on the inner wall surface of the first riser 52.

Moreover, in positions corresponding to the liquid film separation space 73 of the first riser 52, and above the liquid film separation vane 74, there is formed a plurality of slits 75. These slits 75 are formed long in the circumferential direction, and are arranged in a plurality of stages (three stages in this second embodiment).

In this second embodiment, there has been described a case where the plurality of slits 75 are formed long in the circumferential direction and are arranged in a plurality of stages. However, the configuration is not limited to this, and the respective slits 75 may be formed long in the axial direction, and several of them may be arranged around the circumferential direction.

Within the liquid film separation space 72 formed by the first riser 52 and the inner cone 72 facing each other, the slits 75 are formed in the first riser 52. The slits 75 are formed on the upstream side of the upper end of the liquid film separation space 73 and on the downstream side of the liquid film separation vane 74. In FIG. 3, each slit 75 is of a rectangular shape, and has a length along the circumferential direction of the liquid film separation space defining surface (inner wall surface of the first riser 52), and a width parallel with the axial direction of the first riser 52. There is no particular limitation on the shape of each slit 75. The slits 75 may be installed parallel with the axial direction of the first riser 52 and in a plurality of stages, and they may be parallely installed in a plurality of positions around the circumferential direction of the inner wall surface of the first riser 52.

Furthermore, in a first deck plate 10 of the first riser 52, there is provided a first orifice 42. This first orifice 42 is not formed with a diameter gradually increasing towards the downstream side as it was in the first embodiment above, but is formed in a substantially cylindrical shape.

The cylindrical first orifice 42 is installed in a through hole of the annular-shaped first deck plate 10 which continues to the upper end periphery part of the first downcomer barrel 7. The diameter of the first orifice 42 and the diameter of the through hole in the first deck plate 10 are smaller than the diameter of the first riser 52. Between the lower end of the first orifice 42 and the upper end of the first riser 52, there is ensured a space for allowing swirling liquid film (may contain a steam in some cases) to pass therethrough.

In the second steam-water separator 3, the cylindrical second riser 11 is installed on the downstream side surface of the first deck plate 10. The diameter of the second riser 11 is greater than that of the first orifice 42, and the upper end of the first orifice 42 projects to the second riser 11 side.

(Operation)

With this type of configuration, having been introduced into the first riser 5 of the first steam-water separator 2, the gas-liquid two-phase flow rising from the steam generator (not shown in the diagram) passes through the first swirl vane 6 and rises while swirling at a low to intermediate speed. As a result, hot water contained in this swirling and rising gas-liquid two-phase flow is pushed against the inner cone 72, and becomes a liquid film. The liquid film is entrained with the rising gas-liquid two-phase flow and rises, and is blown into the liquid film separation space 73.

Moreover, the mixed flow primarily composed of hot water descends into the liquid film separation space 73, while maintaining its swirling motion and continuing to entrain steam therewith. This mixed flow is separated by the liquid film separation vane 74 into steam and water, and hot water still contained in the mixed flow continues to travel and descend through between the blades 74a.

Here, the first riser 52 has the plurality of slits 75 formed therein, and the liquid film attached on the inner wall of the first riser 52 receives the swirling force and consequently flows rapidly into the first downcomer space via the respective slits 75.

(Operation)

Therefore, according to the second embodiment described above, in addition to the effect similar to that of the above first embodiment, it is possible to more efficiently perform steam-water separation on a gas-liquid two-phase flow by providing the inner cone 72 within the first riser 52 of the first steam-water separator 22.

Moreover, by providing the liquid film separation vane 74 within the liquid film separation space 73 defined by the inner cone 72 and the first riser 52, it is possible to reduce carry-under more reliably. Furthermore, by forming the plurality of slits 75 in the first riser 52, hot water attached on the liquid film separation space 73 side of the first riser 52 can rapidly flow out to the first downcomer space 8 side. Therefore, it is possible to separate a gas-liquid two-phase flow into steam and water even more efficiently.

Third Embodiment

First Steam-Water Separator

Figure 4:
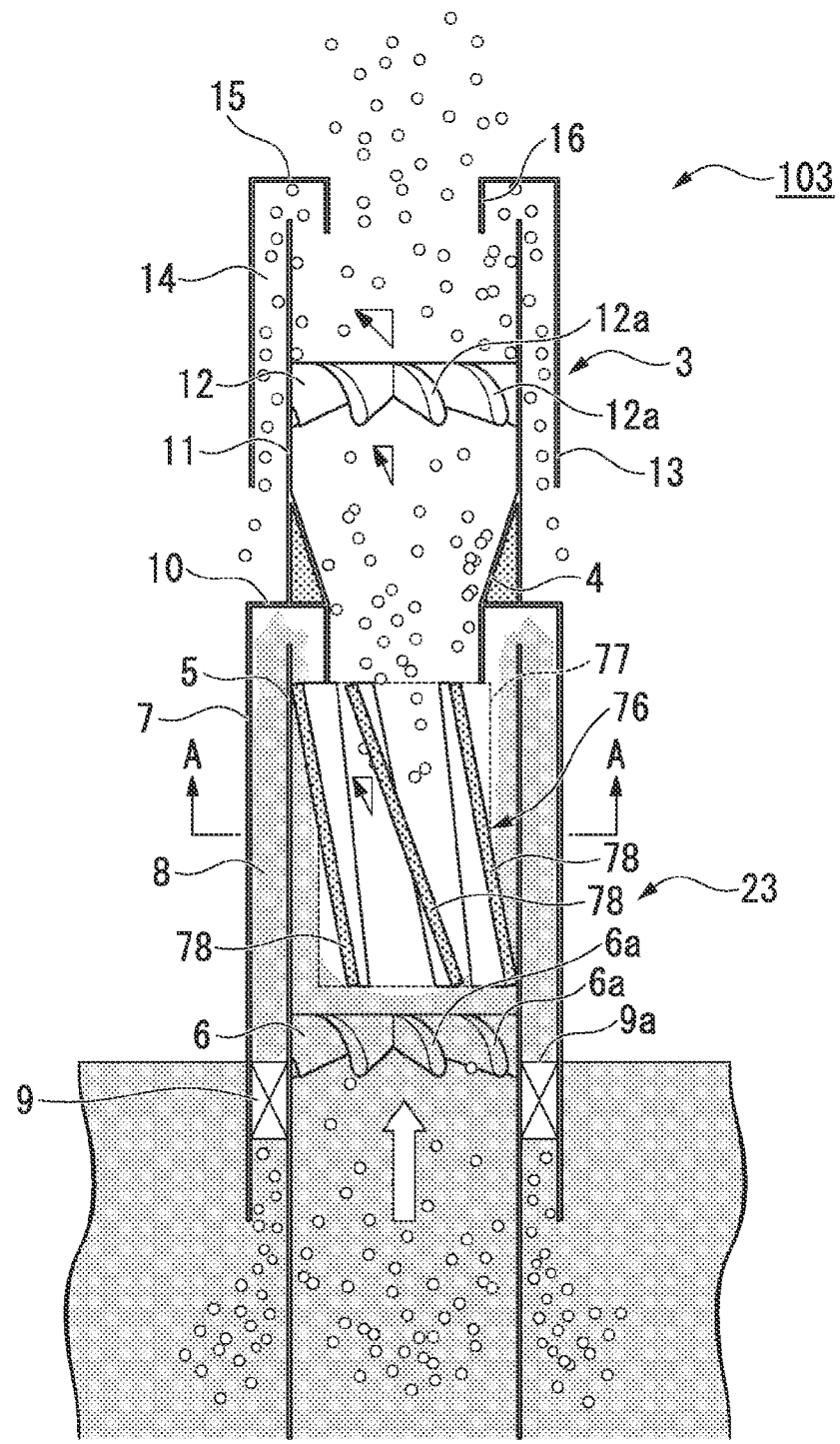
FIG. 4 is a schematic configuration diagram of a multi-stage steam-water separation device according to a third embodiment of the present invention.
Figure 5:
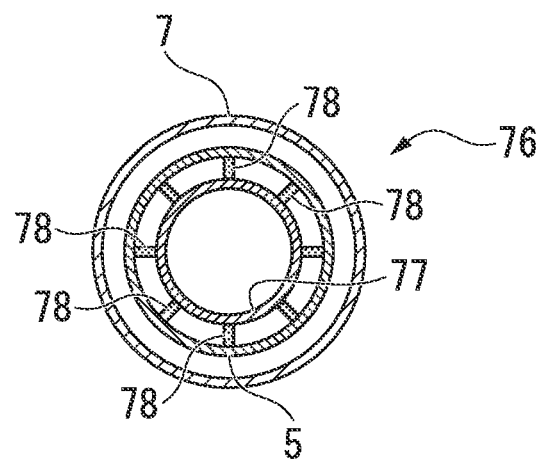
FIG. 5 is a cross-sectional view taken along the line A-A in FIG. 4.

Next, a third embodiment of the present invention is described, with reference to FIG. 4 and FIG. 5.

FIG. 4 is a schematic configuration diagram of a multi-stage steam-water separation device 103 according to the third embodiment. FIG. 5 is a cross-sectional view of the multi-stage steam-water separation device 103 taken along the line A-A in FIG. 4.

As shown in FIG. 4 and FIG. 5, in a first steam-water separator 23 of the multi-stage steam-water separation device 103, on the downstream side of a first swirl vane 6 in a first riser 5, there is provided a third swirl vane 76.

The third swirl vane 76 has a substantially cylindrical cylinder part 77 with a diameter smaller than that of the first riser 5, and a plurality of blade parts 78 parallely provided around the circumferential direction on the outer circumferential surface of the cylinder part 77.

The cylinder part 77 of the third swirl vane 76 is formed long along the vertical direction, and a gas-liquid two-phase flow can pass through the interior thereof. Moreover, the inner diameter of the cylinder part 77 is set to a diameter substantially the same as the inner diameter of the entry periphery of the first orifice 4.

The angle of attack of the blade parts 78 is set greater than the angle of attack of the blades 6a of the first swirl vane 6, and is set smaller than the angle of attack of the blades 12a of the second swirl vane 12. That is to say, the third swirl vane 76 causes the gas-liquid flow to rise and swirl at a speed higher than that provided by the first swirl vane 6 and at a speed lower than that provided by the second swirl vane 12.

The blade parts 78 are installed angled at the above angle of attack, along the surface from the lower end part to the upper end part of the cylinder part 77. The width of each blade part 78 is substantially equal to the shortest distance between the outer circumferential surface of the cylinder part 77 and the inner circumferential surface of the first riser 5.

In FIG. 4, the lower end of the first orifice 4 and the upper end of the cylinder part 77 are continuous from each other. In the third embodiment, a first orifice 4 similar to that of the first embodiment is used as the first orifice 4. Moreover, in the third embodiment, a second steam-water separator 3 similar to that of the first embodiment is used as the second steam-water separator 3.

(Operation)

With this type of configuration, the third swirl vane 76 imparts an additional swirling force to the mixed flow, of the gas-liquid two-phase flow passing through the first swirl vane 6 and rising while swirling at a low to intermediate speed, which travels outside the cylinder part 77 of the third swirl vane 76, and thus promotes steam-water separation thereof.

On the other hand, of the gas-liquid two-phase flow, the mixed flow passing through the cylinder part 77 of the third swirl vane 76 becomes a liquid film, as hot water contained in this mixed flow is pushed against the inner circumferential surface of the cylinder part 77.

(Operation)

Therefore, according to the third embodiment described above, in addition to the effect similar to that of the above second embodiment, by providing the third swirl vane 76 in the first steam-water separator 23, it is possible to perform steam-water separation with the gas-liquid two-phase flow more efficiently.

Moreover, by configuring the third swirl vane 76 with the cylinder part 77 and the blade parts 78, it is possible to suppress a reduction in pressure of the mixed flow when it passes through the third swirl vane 76.

Fourth Embodiment

Second Steam-Water Separator

Figure 6:
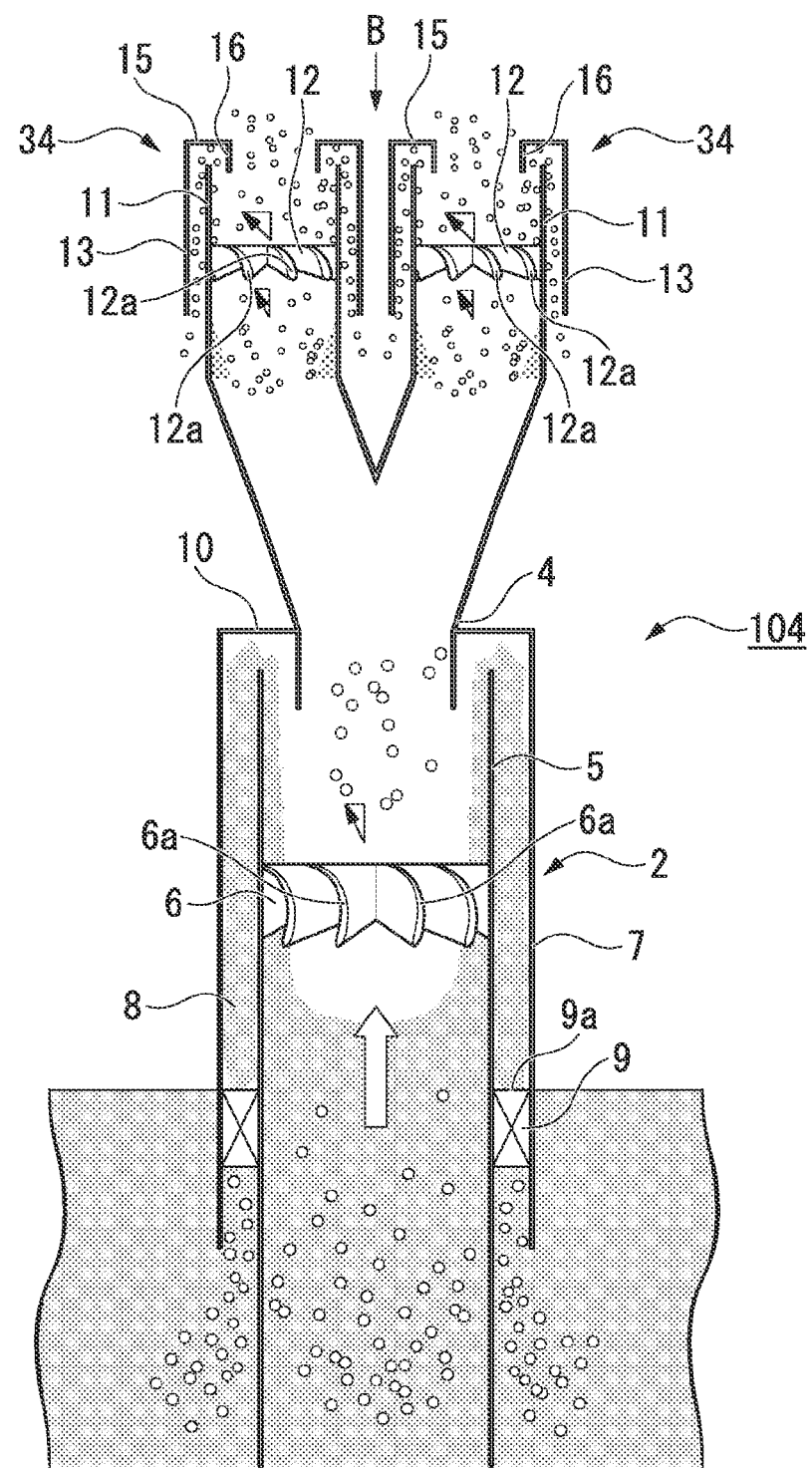
FIG. 6 is a schematic configuration diagram of a multi-stage steam-water separation device according to a fourth embodiment of the present invention.
Figure 7:
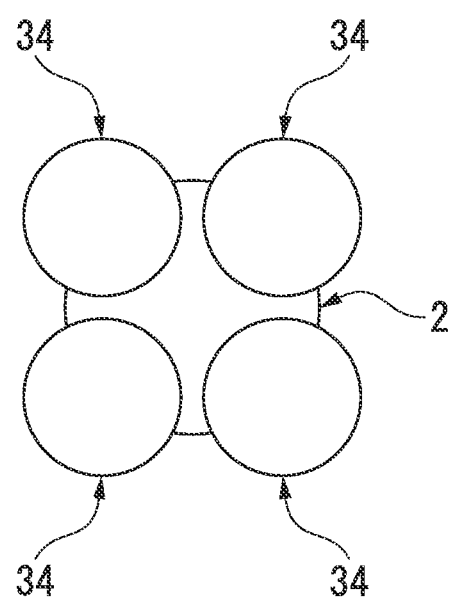
FIG. 7 is an auxiliary view seen in the direction of arrow B in FIG. 6.

Next, a fourth embodiment of the present invention is described, with reference to FIG. 6 and FIG. 7.

FIG. 6 is a schematic configuration diagram of a multi-stage steam-water separation device 104 according to the fourth embodiment. FIG. 7 is an auxiliary view seen in the direction of arrow B in FIG. 6.

As shown in FIG. 6 and FIG. 7, on the downstream side of a first steam-water separator 2, to the multi-stage steam-water separation device 104, there are connected a plurality of second steam-water separators 34.

More specifically, on the downstream side of the first steam-water separator 2, there are provided four second steam-water separators 34. Second risers 11 of the respective second steam-water separators are formed so as to approach each other with approach towards the first steam-water separator 2 side, and are consolidated at a first orifice 4.

Here, the size of the second steam-water separator 34 of this fourth embodiment is set to a size smaller than that of the second steam-water separator 3 in the first embodiment described above since four of them are parallely provided. However, the configuration of each second steam-water separator 34 is similar to that in the first embodiment.

In the fourth embodiment, a first steam-water separator 2 similar to the first steam-water separator 2 of the first embodiment is used as the first steam-water separator.

The first orifice 4 passes through the through hole in the first deck plate 10. The first orifice 4 has a cylinder part on the upstream side and a diameter-expanding part on the downstream side which continues from the cylinder part. The cylinder part of the first orifice 4 has a configuration similar to that in the first embodiment. The diameter-expanding part of the first orifice 4 is formed with a plurality of parallely provided tubes which are branched from the upstream side to the downstream side, with the lower end periphery part of the diameter-expanding part serving as the base end thereof. As for the plurality of the tubes which form the diameter-expanding part of the first orifice 4, the adjacent tubes are arranged so as to be gradually apart from each other with approach from the upstream side to the downstream side. That is to say, the distance between the centers of adjacent tubes becomes gradually greater with approach from the upstream side to the downstream side. The second steam-water separator 34 is installed on the upper end part of each of the plurality of tubes, which form the diameter-expanding part of the first orifice 4. Each upper end periphery part of the plurality of tubes, which form the diameter-expanding part of the first orifice 4, and the lower end periphery part of the second riser 11 of each second steam-water separator 34 are continuous with each other.

(Operation)

With this type of configuration, the mixed flow flowed out from the first steam-water separator 2 via the first orifice 4 is distributed to each second steam-water separator 3. Here, since the second steam-water separators 3 are provided parallelly, the total sectional area of the second risers 11 increases. Therefore, the mixed flow passing through the first orifice 4 has its speed reduced in the second risers 11 and passes through the second swirl vanes 12.

(Operation)

Therefore, according to the fourth embodiment described above, in addition to an effect similar to that of the above first embodiment, since the mixed flow is introduced into the second steam-water separators 3 with its speed being reduced to a speed lower than that in the first embodiment, it is possible to increase the steam-water separation efficiency due to this speed reduction.

In the above fourth embodiment, there has been described a case where four second steam-water separators 3 are provided parallely. However, the configuration is not limited to this, and it is sufficient to parallely provide two or more second steam-water separators 3. Moreover, the size of the second steam-water separators 3 may be changed according to the number of the second steam-water separators to be installed, and it may be changed according to the desired steam-water separation efficiency.

Fifth Embodiment

Steam-Water Separator

Figure 8:
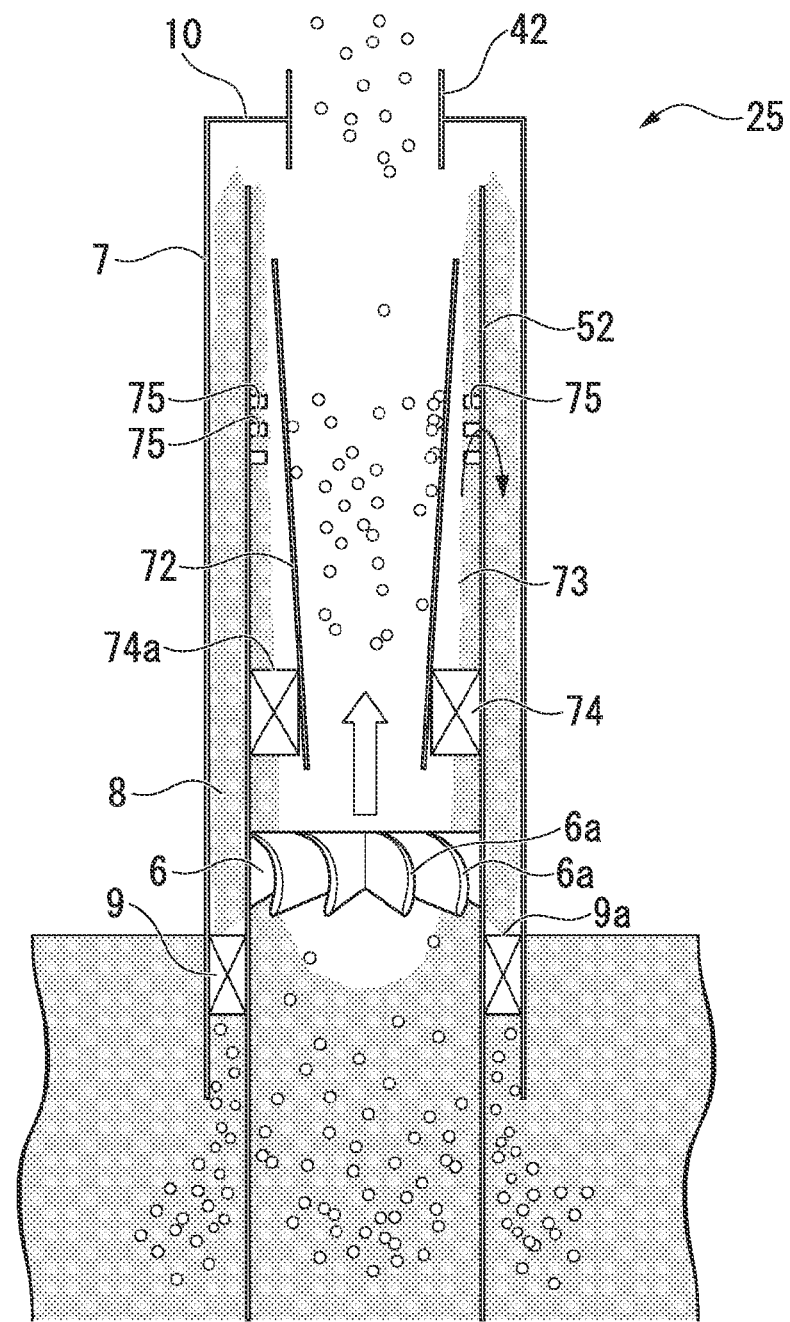
FIG. 8 is a schematic configuration diagram of a steam-water separator according to a fifth embodiment of the present invention.

Next, a fifth embodiment of the present invention is described, with reference to FIG. 8.

FIG. 8 is a schematic configuration diagram of a steam-water separator 25 according to the fifth embodiment.

Here, as shown in FIG. 3 and FIG. 8, the fifth embodiment differs from the second embodiment in the following points. The fifth embodiment is of a configuration where the second steam-water separator 3 is removed from the multi-stage steam-water separation device 102 of the second embodiment, whereas the second embodiment is configured in two stages with the steam-water separators 22 and 3, comprising the first steam-water separator 22, and the second steam-water separator 3 provided on the downstream side of this first steam-water separator 22.

That is to say, the steam-water separator 25 has a first riser 52 and a first downcomer barrel 7, and a first swirl vane 6 and an inner cone 72 are provided in the first riser 52. Moreover, a swirl return vane 9 is provided in a first downcomer space 8 defined by the first riser 52 and the first downcomer barrel 7. Furthermore, a liquid film separation vane 74 is provided in a liquid film separation space 73 defined by the inner cone 72 and the first riser 52. Moreover, on the upper side of the liquid film separation vane 74, in the first riser 52, there are formed a plurality of slits 75.

Steam, which is made to swirl and rise by the first swirl vane 6, flows out through a first orifice 42 arranged above the first riser 52 and the first downcomer barrel 7.

Even with this type of configuration, since the inner cone 72 is provided above the first swirl vane 6 and there are formed the slits 75, it is possible to increase the level of efficiency in steam-water separation of gas-liquid two-phase flow, compared to conventional steam-water separators.

The present invention is not limited by the embodiments described above, and various modifications may be made to the above embodiments without departing from the scope of the invention.

For example, in the above fourth embodiment, there has been described a case where four second steam-water separators 34 are parallely provided on the downstream side of the first steam-water separator 2. However, this configuration may be applied to the second embodiment and the third embodiment described above.

Moreover, in the first embodiment to the fourth embodiment described above, there has been described a case where a swirl return vane 9 is provided in the first downcomer space 8. However, the configuration is not limited to this, and a swirl return vane 9 may also be provided in the second downcomer space 14, in addition to the first downcomer space 8.

The present invention is not limited by the above description, and is limited only by the accompanying claims.

DESCRIPTION OF REFERENCE SYMBOLS

1, 102, 103, 104: Multi-stage steam-water separation device
2, 22, 23: First steam-water separator (steam-water separator of first stage)
3, 34: Second steam-water separator (steam-water separator of second stage)
5, 52: First riser (riser)
6: First swirl vane
7: First downcomer barrel (downcomer barrel)
8: First downcomer space (downcomer space)
9: Swirl return vane
9a, 12a: Blade
11: Second riser (riser)
12: Second swirl vane
13: Second downcomer barrel (downcomer barrel)
14: Second downcomer space (downcomer space)
25: Steam-water separator
72: Inner cone
73: Liquid film separation space
74: Liquid film separation vane
75: Slit
76: Third swirl vane
77: Cylinder part
78: Blade part

The invention claimed is:

1. A multi-stage steam-water separation device provided with, in two stages, a steam-water separator, comprising:
   a cylindrical riser, into which a gas-liquid two-phase flow composed of a mixture of steam and hot water is introduced, which is provided for each of the steam-water separator of a first stage and a second stage;
   a downcomer barrel which is provided for each of the steam-water separator of the first stage and the second stage, the downcomer barrel of the first stage is arranged so as to surround the periphery of the riser of the steam-water separator of the first stage and the downcomer barrel of the second stage is arranged so as to surround the periphery of the riser of the steam-water separator of the second stage;
   a first swirl vane which is provided within the riser of the steam-water separator of the first stage, and which causes the gas-liquid two-phase flow to rise while swirling, and
   a second swirl vane which is provided within said riser of the steam-water separator of the second stage and which causes the gas-liquid two-phase flow which has passed through the first swirl vane to rise while swirling at a speed higher than that provided by the first swirl vane, wherein
   in the steam-water separator of the first stage, on a downstream side of the first swirl vane in the riser, there is provided an inner cone formed with a diameter gradually increasing towards the downstream side.

2. A multi-stage steam-water separation device according to claim 1, wherein within a downcomer space, of at least said steam-water separator of the first stage, defined by said riser and said downcomer barrel, there is provided a swirl return vane for restricting the swirling of a mixed flow primarily composed of hot water, which is introduced into this downcomer space.

3. A multi-stage steam-water separation device according to claim 1, wherein
   within a liquid film separation space defined by the inner cone and the riser, there is provided a liquid film separation vane for restricting the swirling of a mixed flow primarily composed of hot water, to be introduced into the liquid film separation space.

4. A multi-stage steam-water separation device according to claim 2, wherein in positions corresponding to said liquid film separation space of said riser and on an upper side of said liquid film separation vane in a gravitational direction, there are provided a plurality of slits.

5. A multi-stage water-separation device provided with, in two stages, a steam-water separator, comprising:
- a cylindrical riser, into which a gas-liquid two-phase flow composed of a mixture of steam and hot water is introduced, which is provided for each of the steam-water separator of a first stage and a second stage:
- a downcomer barrel which is provided for each of the steam-water separator of the first stage and the second stage, the downcomer barrel of the first stage is arranged so as to surround the periphery of the riser of the steam-water separator of the first stage and the downcomer barrel of the second stage is arranged so as to surround the periphery of the riser of the steam-water separator of the second stage;
- a first swirl vane which is provided within the riser of the steam-water separator of the first stage, and which causes the gas-liquid two-phase flow to rise while swirling, and
- a second swirl vane which is provided within the riser of the steam-water separator of the second stage and which causes the gas-liquid two-phase flow which has passed through the first swirl vane to rise while swirling at a speed higher than that provided by the first swirl vane, wherein
in the steam-water separator of the first stage,
on the downstream side of the first swirl vane in the riser, there is provided a third swirl vane which causes the gas-liquid two-phase flow to swirl at a speed higher than that provided by the first swirl vane, and which causes the gas-liquid two-phase flow to swirl at a speed lower than that provided by the second swirl vane.

6. A multi-stage steam-water separation device according to claim 5, wherein said third swirl vane has;
- a cylinder part for allowing said gas-liquid two-phase flow to pass through the interior thereof, and
- a plurality of blade parts provided around the circumferential direction on the outer circumferential surface of said cylinder part.

7. A multi-stage steam-water separation device provided with, in two stages, a steam-water separator, comprising:
- a cylindrical riser, into which a gas-liquid two-phase flow composed of a mixture of steam and hot water is introduced, which is provided for each of the steam-water separator of a first stage and a second stage;
- a downcomer barrel which is provided for each of the steam-water separator of the first stage and the second stage, the downcomer barrel of the first stage is arranged so as to surround the periphery of the riser of the steam-water separator of the first stage and the downcomer barrel of the second stage is arranged so as to surround the periphery of the riser of the steam-water separator of the second stage;
- a first swirl vane which is provided within the riser of the steam-water separator of the first stage, and which causes the gas-liquid two-phase flow to rise while swirling, and
- a second swirl vane which is provided within the riser of the steam-water separator of the second stage and which causes the gas-liquid two-phase flow which has passed through the first swirl vane to rise while swirling at a speed higher than that provided by the first swirl vane, wherein
on a downstream side of the steam-water separator of the first stage, there are parallely provided a plurality of the steam-water separators of the second stage, and the riser of respective steam-water separators of the second stage are consolidated with the riser of the steam-water separator of the first stage.

8. A steam-water separator provided with: a cylindrical riser, into which a gas-liquid two-phase flow composed of a mixture of steam and hot water is introduced; and
- a downcomer barrel arranged so as to surround a periphery of this riser, wherein there are provided:
- a swirl vane which is provided in said riser, and which causes said gas-liquid two-phase flow to rise while swirling;
- an inner cone which is provided in said riser, and which is formed, on a downstream side of this swirl vane, with a diameter gradually increasing towards the downstream side; and
- a liquid film separation vane which is provided in a liquid film separation space defined by said inner cone and said riser, and which restricts the swirling of a mixed flow primarily composed of hot water, to be introduced into this liquid film separation space.

9. A steam-water separator according to claim 8 wherein, within a downcomer space defined by said riser and said downcomer barrel, there is provided a swirl return vane for restricting the swirling of a mixed flow primarily composed of hot water, to be introduced into this downcomer space.

10. A steam-water separator according to claim 8, wherein in positions corresponding to said liquid film separation space of said riser and on an upper side of said liquid film separation vane in a gravitational direction, there are provided a plurality of slits.

* * * * *